United States Patent [19]

Cirillo

[11] Patent Number: 5,064,318
[45] Date of Patent: Nov. 12, 1991

[54] PRECISION GUIDANCE APPARATUS

[75] Inventor: Robert J. Cirillo, Torrance, Calif.

[73] Assignee: Excellon Automation, Torrance, Calif.

[21] Appl. No.: 577,055

[22] Filed: Aug. 31, 1990

Related U.S. Application Data

[63] Continuation of Ser. No. 157,869, Feb. 19, 1988, abandoned.

[51] Int. Cl.$^5$ ............................................... B23B 39/16
[52] U.S. Cl. ........................................... 408/69; 408/3;
    408/52; 408/53; 384/12; 384/37; 384/38
[58] Field of Search ................... 708/69, 53, 52, 50,
    708/31, 3

[56] References Cited

U.S. PATENT DOCUMENTS

| | | | |
|---|---|---|---|
| 2,522,695 | 9/1950 | Walter | 384/54 |
| 2,876,650 | 3/1959 | Sangster | 408/3 X |
| 3,578,827 | 5/1971 | Smith | 308/5 |
| 3,973,863 | 8/1976 | Smith | 408/241 R |

OTHER PUBLICATIONS

A Product Brochure for an "Anoride," Made by Anorad Corporation and Believed to Have Been Published in 1984.

Primary Examiner—Larry I. Schwartz
Assistant Examiner—Robert Schultz
Attorney, Agent, or Firm—Knobbe, Martens, Olson & Bear

[57] ABSTRACT

A guided member is engaged with a guiding member and the guided member and guiding members are movable relative to each other. A pair of planar, parallel guide surfaces on the guide member are engaged by a pair of bearings mounted on the guided member. One of the bearings is resiliently biased into engagement with the guide surface which is less precisely formed so that irregularities in that guide surface or lack of parallelism between the guide surfaces is accommodated by displacement of the biased bearing. The bearings are mounted on bearing supports which depend from either side of a cross piece. The cross piece is secured to the guided member such that a portion of the cross piece is uncoupled from the guided member and is free to be deflected, thus providing the biasing for the biased bearing without transmitting stress to the guided member. Preferably, the apparatus is employed in a machine tool to guide the movement of a worktable.

8 Claims, 2 Drawing Sheets

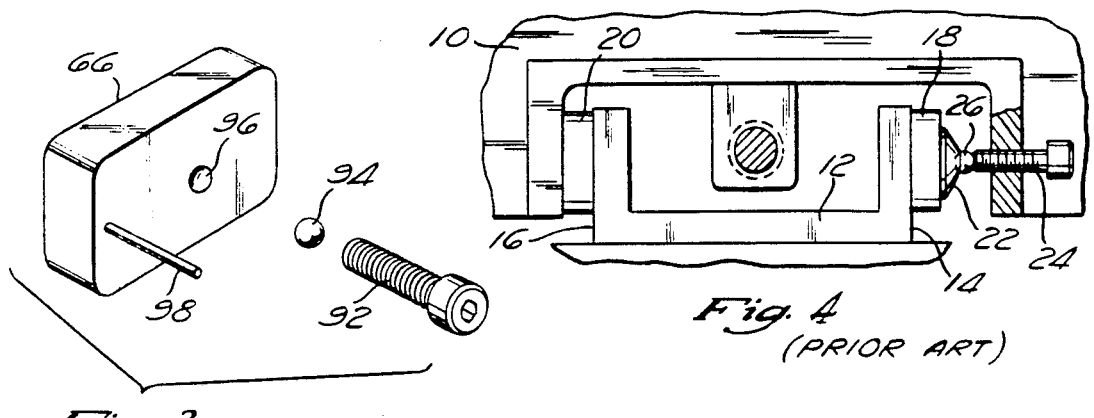
Fig. 3
Fig. 4 (PRIOR ART)
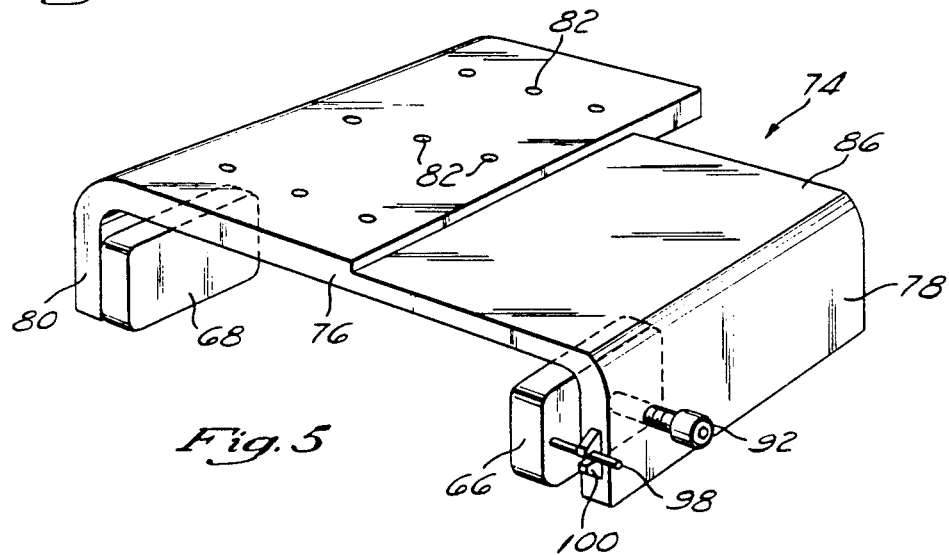
Fig. 5
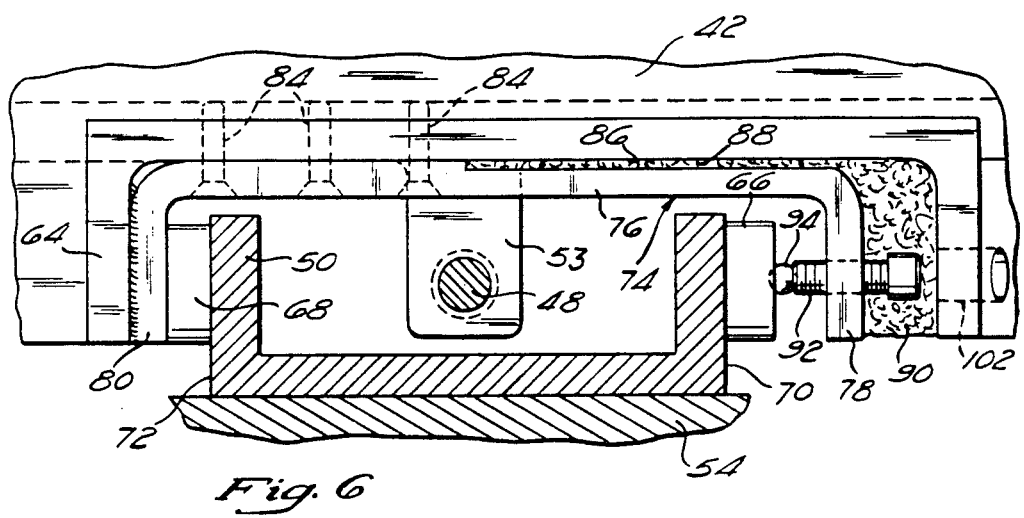
Fig. 6

PRECISION GUIDANCE APPARATUS

This application is a continuation of application Ser. No. 157,869, filed Feb. 19, 1988 and now abandoned.

BACKGROUND OF THE INVENTION

This invention relates generally to the field of precision guidance systems, and more particularly to a system for use in guiding a movable worktable on a machine tool in which bearing members are biased into engagement with a guide rail to accommodate for imprecisions in the components of the guidance system.

A variety of machine tools have been designed in which the workpiece to be machined is mounted on a worktable which is movable relative to the cutting tool which is to perform the machining operation. One of these types of machine tools are drilling machines which have been designed to drill holes in printed circuit boards. Printed circuit boards have a large number of holes which must be drilled at precise locations to enable mounting of electrical components on the boards. Computer controlled drilling machines have been developed to permit mass production of circuit boards at high rates. Typically, these drilling machines have a worktable mounted on a base and movable along both axes of a horizontal plane. The printed circuit boards, or workpieces, are mounted in stacks on the worktable. Movement of the worktable in the horizontal plane positions the circuit boards beneath a drill spindle at the precise location where holes are desired. Drilling operations are achieved through vertical travel of the drill spindle.

Since the diameter of the holes drilled in the circuit boards can be extremely small, on the order of the size of human hairs, it is imperative that movement of the worktable be precisely controlled. In prior systems, such as that illustrated in FIG. 4, a worktable 10 is guided along one axis by a guide rail 12 having two straight, parallel, vertically oriented side surfaces 14, 16. The worktable 10 straddles the sides 14, 16 of the guide rail 12 as it moves parallel to the side surfaces 14, 16. The worktable 10 includes air bearing shoes 18, 20 which engage each side of the guide rail 12 to minimize friction. Although not shown in FIG. 4, the left-hand bearing shoe 20 has a ball and screw attached in a similar manner to the ball 26 and the screw 24 shown in the right-hand side of FIG. 4.

To reduce manufacturing costs, only one of the guide rail side surfaces 16 is machined to be truly linear and planar. The second side surface 14, although still machined to close tolerances, may have slight irregularities or lack true parallelism with the first surface 16. To ensure that the worktable 10 moves parallel to the first surface 16, the bearing 18 which engages the second surface 14 is biased by a Belleville washer 22 which deflects to allow displacement of the bearing 18 toward or away from the second surface 14, thus accounting for depressions or raised portions of the second surface 14, respectively.

Several drawbacks are prevalent with these prior systems. First, in order to preload the washer 22 under the proper amount of compressive force to maintain the desired running clearance between the air bearing shoes 18, 20 and the guide rail surfaces 14, 16, a screw 24 must be threaded through the worktable 10 and driven against a ball 26 nesting within the washer 22. This screw 24 transmits the preloading force to the worktable 10 itself and may cause distortions or deflections in the worktable 10. Second, the biasing force provided by the washer 22 is somewhat unpredictable due to the frictional engagement between the washer 22 and the air bearing shoe 18 as the washer 22 deflects. As forces on the washer 22 vary, hysteresis effects are induced in the washer 22, further limiting the repeatability of the performance of the washer 22 as a biasing member.

Similar problems have been encountered with the guidance system disclosed in Smith U.S. Pat. No. 3,578,827, which also permits spring preload forces to be transmitted to the precision components of the guidance system.

Thus, a need exists for a guidance system in which preload forces on the biasing member are not transmitted to the movable member being guided, and in which the biasing force applied is repeatable and predictable.

SUMMARY OF THE INVENTION

Briefly, the present invention comprises an apparatus for providing precision movement between two members which are movable relative to each other. The apparatus comprises a guiding member having a pair of substantially planar and parallel guide surfaces, and a guided member engaged with said guiding member such that the guiding member and the guided member are movable relative to each other in a direction parallel to the guide surfaces. A pair of bearings are secured to the guided member to minimize friction between the guided member and the guiding member guide surfaces. A first bearing support is fixed stationary relative to the guided member, and a first one of the bearings is mounted on the first bearing support. Correspondingly, a second bearing support is provided on which a second one of the bearings is mounted.

A cross piece joins the first bearing support with the second bearing support, and resiliently biases the second bearing toward the corresponding guide surface. Deflection of the cross member allows movement of the second bearing to accommodate for irregularities in the guide member surfaces and lack of the true parallelism between the guide member surfaces.

Preferably, the guided member comprises a worktable and the guiding member is mounted on the base of a machine tool so that movement of the worktable relative to the guiding member enables precise positioning of a workpiece mounted on the worktable.

A key feature of the invention is that a portion of the cross piece is uncoupled from the guided member, or worktable, to minimize stress to the worktable frame deflection of the cross piece. As a result, the worktable itself can be machined to precise tolerances prior to engagement with the guiding member, without any deformation or stress being induced in the worktable which would cause deviation from the original tolerances to which the worktable is manufactured.

The cross piece may be secured directly to the worktable, or be attached only to the first bearing support which in turn is attached to the worktable. In either case, a portion of the cross piece remains uncoupled from the worktable with sufficient clearance to allow for deflection of the cross piece without causing transmission of stress between the cross piece and the worktable. Preferably, a portion of the cross piece which is spaced from the worktable is of greater resilience then the remainder of the cross piece, and is oriented adjacent to the second bearing support. This portion of greater resilience can be formed by, for example, varying the width of the cross piece or varying the thickness of the cross piece.

In a preferred embodiment, the bearing supports depend from either end of the cross piece, so as to form an overall U-shaped caliper which straddles the guiding member, with the guiding member disposed between the bearing supports.

Another key feature of the invention is that the second bearing is movable relative to the second bearing support by means of a preload member. The preload member is adjustable to drive the second bearing into engagement with the corresponding guide surface with a desired preload force. Preferably, the preload member comprises a screw threaded through the second bearing support and engaging the second bearing Advantageously, since the preload member is not directly coupled to the worktable, stress in the worktable, deformation of the worktable, and inaccuracies in the worktable itself, resulting from preloading of the bearing, are minimized. Advantageously, the caliper combines both functions of being a biasing member and providing the structure against which the preload member works to apply force to the bearing.

BRIEF DESCRIPTION OF THE DRAWINGS

FIG. 3 is an exploded perspective view of an air bearing shoe and preloading screw used in the present precision guidance system.

FIG. 4 is an elevational view of a prior art guidance system.

FIG. 5 is a perspective view of a caliper member according to the present invention.

FIG. 6 is an elevational view of the present precision guidance system.

DETAILED DESCRIPTION OF A PREFERRED EMBODIMENT

Figure 1:
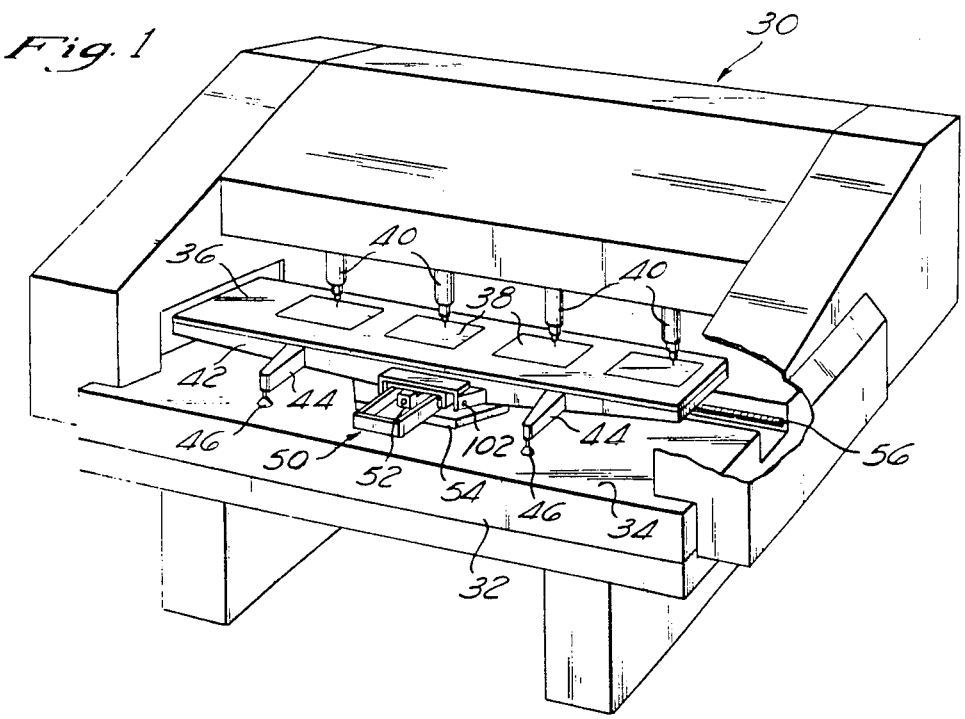
FIG. 1 is a partially cutaway perspective view of a drilling machine incorporating the precision guidance apparatus of the present invention.

Referring to FIG. 1, a drilling machine 30 is shown. The drilling machine 30 includes a large base 32, preferably formed of granite, and having a substantially horizontal, planar top surface 34. A worktable 36 is mounted on the top surface 34 so as to be movable relative thereto. The worktable 36 is adapted so that workpieces 38, such as printed circuit boards, can be secured to the worktable 36 so as to enable drilling operations to take place on the workpieces 38 A plurality of drill spindles 40 are provided on the drilling machine 30 and are movable vertically, parallel to a Z-axis, to drill holes in the workpieces 38.

The worktable 36 is itself movable relative to the base 32 in a horizontal plane parallel to the top surface 34 of the base 32. Within that horizontal plane, the worktable 36 is movable parallel to an X-axis, which extends from side to side across the base 32, and parallel to a Y-axis, which extends from front to back across the base 32. The drilling machine 30 includes a computer control system which enables movement of the worktable 36 along the X- and Y-axes so as to precisely position a workpiece 38 mounted on the worktable 36. Thus, holes can be drilled in the workpiece 38 at predetermined locations. When used for drilling holes in printed circuit boards, the precision of the location of the holes drilled is critical. Otherwise, when electrical components (not shown) are mounted on the printed circuit boards, the leads of the components will not properly mate with the holes drilled in the printed circuit board. Since the electronic components themselves are extremely small, as is the diameter of the holes being drilled, the predictability and the degree of precision which can be achieved in connection with the movement of the worktable 36 is critical.

The worktable 36 includes an underlying frame, or guided member 42 which has a plurality of legs 44 to support the worktable 36 on the top surface 34 of the base 32. Air bearing shoes 46 are mounted on the ends of the legs 44 so that friction between the legs 44 and the top surface 34 is minimal.

Figure 2:
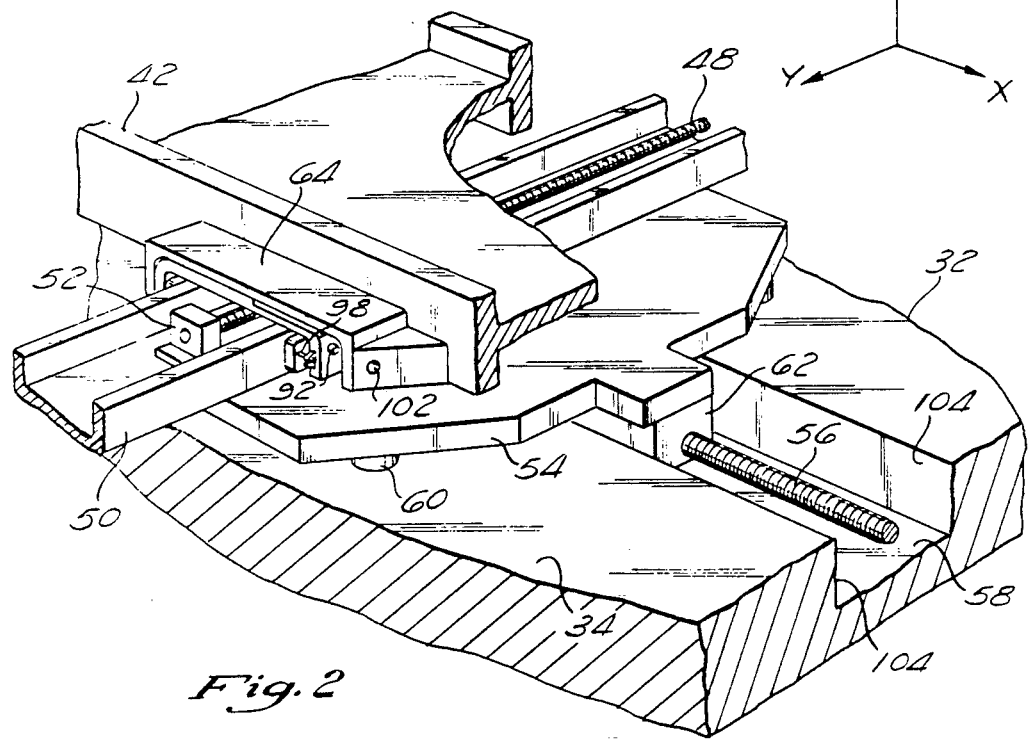
FIG. 2 is an enlarged, partially cutaway perspective view of the precision guidance system shown in FIG. 1.

As seen in FIGS. 1 and 2, to cause displacement of the worktable 36 in the Y-direction, an elongate Y-axis lead screw 48 is disposed beneath the frame 42, and above the top surface 34 of the base 32, so as to be substantially parallel to the Y-axis. The Y-axis lead screw 48 is rotatably mounted within a substantially U-shaped guide rail, or guiding rail 50. The Y-axis lead screw 48 is fixed to the guide rail 50 by means of a mounting block 52 so as to prevent displacement of the Y-axis lead screw 48 relative to the guide rail 50 along a direction parallel to the longitudinal axis of the Y-axis lead screw 48. The Y-axis lead screw 48 is coupled to the frame 42 of the worktable 36 by means of a ball nut mechanism 53, shown schematically in FIG. 6. Preferably, the ball nut mechanism 53 utilized is that described in commonly assigned U.S. patent application Serial No. 157,870 for a Drilling Machine Leveling Mechanism, filed Feb. 19, 1988, naming Robert Cirillo and Frank Garbino as inventors, now abandoned, the disclosure of which is incorporated herein by reference.

Rotation of the Y-axis lead screw 48 causes advancement of the ball nut mechanism 53 relative to the Y-axis lead screw 48, in turn causing displacement of the worktable 36 relative to the guide rail 50, in a direction parallel to the Y-axis. As is discussed in greater detail below, the guide rail 50 and the precision guidance apparatus of the present invention ensure truly linear motion of the worktable 36 as it is being displaced by the Y-axis lead screw 48.

As shown in FIGS. 1 and 2, the guide rail 50 is fixed relative to a carriage assembly 54, which is positioned beneath the guide rail 50 and above the top surface 34 of the base 32. The carriage assembly 54 is movable in a direction parallel to the X-axis, by means of rotation of an elongate X-axis lead screw 56. As shown in FIG. 2, the X-axis lead screw 56 is oriented parallel to the X-axis, and is disposed within a U-shaped channel 58 formed in the top surface 34 of the base 32. The carriage assembly 54 is mounted on air bearing shoes 60 which minimize friction between the carriage assembly 54 and the top surface 34 of the base 32 as the carriage assembly 54 is displaced. The carriage assembly 54 is coupled to the X-axis lead screw 58 by means of a ball nut mechanism 62 which is shown schematically in FIG. 2, and which is preferably of the type discussed above with respect to the Y-axis ball nut mechanism 53. Rotation of the X-axis lead screw 56 causes displacement of the carriage assembly 54 and therefore guide rail 50 in a direction parallel to the X-axis.

As shown in FIG. 2, the frame 42 of the worktable 36 includes a downwardly facing U-shaped channel 64 which straddles the guide rail 50 so that X-axis movement of the guide rail 50 causes engagement between the guide rail 50 and the worktable frame 42 such that the worktable frame 42 is also moved in a direction parallel to the X-axis. As a result, between a combination of rotation of the X-axis and Y-axis lead screws 56 and 48, respectively, the worktable 36, and therefore any workpieces 38 positioned thereon, can be oriented in any desired location within a horizontal plane.

As is best seen in FIGS. 2, 3, 5 and 6, the present precision guidance apparatus properly orients the worktable, or guided member 36 relative to the guide rail, or guiding member 50 so as to ensure true linear motion of the worktable 36 upon rotation of the Y-axis lead screw 48. The guide rail 50 includes two vertically oriented, planar, substantially parallel, outwardly facing side surfaces, or ways 70, 72. The guidance apparatus includes a pair of air bearing shoes 66, 68 which respectively engage the sides 70, 72 of the guide rail 50. Compressed air is provided to the air bearing shoes 66, 68, so that a film of compressed air between the air bearing shoes 66, 68 and the guide surfaces 70, 72 form air bearings, which minimize the friction between the worktable frame 42 and the guide rail 50 as the worktable 36 is displaced along the Y-axis The clearance between the air bearing shoes 66, 68 and the guide surfaces 70, 72 is minimal, and thus engagement therebetween enables X-direction displacement of the guide rail 50 to be transmitted to the frame 42 of the worktable 36, thus causing X-axis displacement of the worktable 36.

The air bearing shoes 66, 68 are mounted on a caliper 74 which has a substantially U-shaped cross section when viewed in elevation, as in FIG. 5. The caliper 74 includes a substantially planar cross piece 76. Preferably, the caliper 74 is cut from rectangular tubular steel stock, but can be cast or formed from bent plate. On either end of the cross piece 76, a bearing support 78, 80 depends downwardly. One air bearing shoe 66 is secured to a first one of these bearing supports 78, and the other air bearing shoe 68 is secured to a second air bearing support 80. The air bearing shoes 66, 68 are mounted on the internally facing surfaces of the bearing supports 78, 80 so that the air bearing shoes 66, 68 are opposed to each other. The caliper 74 straddles the guide rail 50 and nests within the downwardly facing, U-shaped channel 64 in the frame 42 of the worktable 36. As shown in FIGS. 5 and 6, a plurality of bores 82 extend through the caliper cross piece 76 to enable bolts 84 to be passed through the cross piece 76 to rigidly fasten the caliper 74 to the frame 42.

The bearing support 80 is rigidly secured to the frame 42 so that there is no relative displacement between the frame 42 and the bearing support member 80. In the preferred embodiment, the cross piece 76 is bolted to the frame 42; however, it is to be understood that the cross piece 76 could be completely uncoupled from the frame 42, with the only securement between the caliper 74 and the frame 42 being achieved through the bearing support 80.

To minimize fabrication costs of the guide rail 50, one guide surface 72 is machined to much more precise tolerance than is the other guide surface 70. Thus, the guide surfaces 70, 72 may not be truly parallel to each other, and the guide surface 70 may have some irregularities, such as depressions or raised portions. To obtain the benefit of the precisely machined guide surface 72, the caliper 74 is designed to closely track that guide surface 72. Thus, the more accurate guide surface 72 forms the true Y-axis, parallel to which the worktable 36 is sought to be displaced.

To accommodate for irregularities and lack of parallelism in the less accurate guide surface 70, the air bearing shoe 66 engaging the less accurate guide surface 70 is biased into engagement with that guide surface 70 so that displacement of the air bearing shoe 66 is possible. This biasing is achieved by means of the caliper cross piece 76, which has a resilient portion 86 adjacent the bearing support 78. The cross piece 76 acts like a long cantilever beam, and bending of the resilient portion 86 provides the biasing force on the air bearing shoe 66. This resilient portion 86 is preferably formed by reducing the thickness of the resilient portion 86 compared to the remainder of the cross piece 76, as seen when viewed in elevation, as in FIG. 6, or by reducing the width of the resilient portion 86, as seen in FIG. 5. Variations in widths and thickness can be used in any combination to achieve the desired degree of resilience.

It is important, however, that the resilient portion 86 not be directly coupled to the frame 42, and in the preferred embodiment, the bolts 84 which secure the caliper 74 to the frame 42 do not extend through the resilient portion 86 of the cross piece 74. This enables deflection of the resilient portion 86 of the cross piece 74, which biases the bearing support 78 and air bearing 66 into engagement with the less accurate guide surface 70. As irregularities in the guide surface 70 are encountered, the air bearing 66 is displaced, yet is always driven into engagement with the guide surface 70 by the biasing force of the resilient portion 86 of the caliper 74. Deflection of the caliper resilient portion 86 is not directly transmitted to the frame 42, nor does it cause distortion or deflection of the frame 42 since a space 88 is provided between the resilient portion 86 and the frame 42. Preferably, this space 88 is formed by reducing the thickness of the cross piece resilient portion 86, however, it also can be achieved by placing shims (not shown) between the remainder of the cross piece 76 and the frame 42. In the preferred embodiment, this space 88 is filled with a resilient, vibration-damping material 90, such as room temperature curing silicon rubber.

As shown in FIGS. 3, 5 and 6, to provide the desired degree of preloading force on the air bearing shoe 66 so that the desired running clearance between the air bearing shoes 66, 68 and the guide surfaces 70, 72 is achieved, the air bearing shoe 66 is mounted on the bearing support 78, so as to be movable relative to the bearing support 78, toward or away from the guide surface 70. In particular, a screw 92 extends through a threaded bore in the bearing support 78 and terminates in a depression which receives a ball 94. The ball 94 correspondingly mates with a depression 96 in the air bearing shoe 66, so as to permit angular displacement of the air bearing shoe 66 to accommodate for lack of linearity in the less accurate guide member surface 70. To prevent rotation of the air bearing shoe member 66 in a vertical plane, a pin 98 extends from the air bearing shoe 66 and is received in a socket 100 on the bearing support 78. Although not shown in FIG. 6, a similar ball and pin mounting arrangement is provided for on the other air bearing shoe 68, however, no preloading mechanism is provided.

By threading or unthreading the screw 92 through the bearing support 78, the air bearing shoe 66 is driven into engagement with the less accurate guide surface 70. As threading continues, the resilient portion 86 of the cross piece 76 is caused to deflect, and thus applies a biasing or preload force on the air bearing shoe 66. By adjustment of the screw 92, the preload force can be adjusted to the appropriate level to provide the appropriate clearance between the guide surfaces 70, 72 and the air bearing shoes 66, 68 once air pressure is induced in the air bearing shoes 66, 68. The screw 92 is accessed through a port 102 in the worktable frame 42; however, the screw 92 and the resilient portion 86 of the cross piece 76 remain uncoupled from the frame 42. Advantageously, the stress upon, or distortion of the frame 42 from the preload force is minimized.

Although not shown, the present precision guidance system could be utilized in connection with the X-axis lead screw 56 by mounting the air bearing shoes 66, 68 on the outwardly facing surfaces of the bearing supports 78, 80 so as to engage guide surfaces 104 in the channel 58 in the base 32.

What is claimed is:

1. In a machine tool having at least one cutting tool for performing a desired machining operation on a workpiece, a base, a work table on which said workpiece rests, and moving means for movably mounting said work table to said base and positioning said workpiece relative to said cutting tool, said moving means including a guiding member on said base having a first guide surface and a second guide surface, said first and second surfaces being substantially planar and substantially parallel to one another, a first bearing which reduces friction between said work table and said first guide surface, a second bearing which reduces friction between said work table and said second guide surface, the improvement comprising:

a caliper interposed between said work table and said base, having first and second rigid portions and a cantilever portion extending therebetween, said first rigid portion being fixed with respect to said work table, said cantilever portion having a first end integral with said first rigid portion and a second end integral with said second rigid portion and spaced from said work table wherein said first bearing is mounted on said first rigid portion and said second bearing is mounted on said second rigid portion;

a preload member; and means joining said preload member to said second rigid portion whereby said preload member urges said second bearing into engagement with said second guide surface and causes deflection of said cantilever portion at said second end to accommodate irregularities in said second guide surface and lack of true parallelism between said first guide surface and said second guide surface.

2. An apparatus, comprising:

a guiding member having a first substantially planar surface and a second substantially planar surface substantially parallel to said first planar surface;

a guided member movable relative to said guiding member in a direction substantially parallel to said first and second surfaces on said guiding member;

a first bearing support;

means fixing said first bearing support relative to said guided member;

a first bearing mounted on said first bearing support and adapted to minimize friction between said guided member and said guiding member first surface;

a second bearing support substantially parallel to said first bearing support and movable relative to said guided member;

a second bearing adapted to minimize friction between said guided member and said guiding member second surface;

means for fixing said second bearing relative to said second bearing support; and a cantilever integral with said first bearing support and said second bearing support, said cantilever constructed and arranged to bias said second bearing towards said guiding member second surface so that deflection of said cantilever provides a biasing force on said second support and said second bearing to accommodate for irregularities in said guiding member second surface and lack of true parallelism between said guiding member first and second surfaces.

3. The apparatus of claim 2, wherein a portion of said cantilever is spaced from said guided member a sufficient distance such that deflection of said cantilever does not cause contact between said cantilever and said guided member to minimize stress to said guided member from deflection of said cantilever.

4. The apparatus of claim 3, wherein at least a portion of said cantilever is of flexibility greater than the rest of said cantilever, and wherein said portion is adjacent to said second bearing support.

5. The apparatus of claim 4, wherein said portion comprises an area of reduced cross-sectional area of said cantilever.

6. An apparatus, comprising:

a guiding member having a first substantially planar surface and a second substantially planar surface substantially parallel to said first surface;

a guided member movable relative to said guiding member in a direction substantially parallel to said first and second surfaces on said guiding member;

a first bearing adapted to minimize friction between said guided member and said guiding member first surface;

means fixing said first bearing with respect to said guided member;

a biasing member having first and second ends, said first end of said biasing member rigidly attached to said guided member, said second end of said biasing member being spaced from said guided member so that said biasing member functions as a cantilever for allowing deflection of said biasing member without requiring corresponding deflection of said guided member thereby minimizing unwanted stressing and deflection of said guided member resulting from deflection of said biasing member;

a bearing support secured to said second end of said biasing member;

a second bearing adapted to minimize friction between said guided member and said guiding member second surface; and a preloading member movably engaged with said bearing support urging said second bearing away from said bearing support and into engagement with said guiding member second surface and causing preloading of a desired stress in said biasing member so that movement of said second bearing perpendicular to said guiding member second surface causes deflection of said biasing member which accommodates for irregularities in said guiding member second surface and lack of true parallelism between said guiding member first and second surfaces.

7. An apparatus, comprising:

a guiding member having a first substantially planar surface and a second substantially planar surface substantially parallel to said first surface;

a guided member;

drive means for reciprocating said guided member relative to said guiding member in a direction substantially parallel to said first and second surfaces;

a first bearing for minimizing friction between said guided member and said guiding member first surface;

means fixing said first bearing to said guided member;

a cantilever member having first and second ends, means fixing said first end of said cantilever member to said guided member and spacing said second end of said cantilever member from said guided member;

a bearing support secured to said second end of said cantilever member;

a second bearing adapted to minimize friction between said guided member and said guiding member second surface;

means fixing said second bearing on said bearing support;

a preloading member urging said second bearing into engagement with said guiding member second surface and causing preloading of a desired stress in said cantilever member; and means movably engaging said preloading member with said bearing support.

8. An apparatus, comprising:

a guiding member defining a longitudinal axis and having a first longitudinally extending substantially planar surface and a second longitudinally extending substantially planar surface substantially parallel to said first surface;

a guided member;

a cross piece having a rigid portion and extending therefrom a resilient cantilever portion constructed so as to be substantially more flexible than said rigid portion in a direction having a circumferential component about said longitudinal axis;

first and second bearings;

means fixing said first bearing with respect to said guided member;

a bearing support member fixed to said cantilever portion;

preload member means for integrally joining said second bearing and said bearing support member and for selectively adjusting the position of said second bearing with respect to said bearing support member in a direction transverse said longitudinal axis;

said first and second bearings being oriented and adapted to engage said guiding member to minimize friction between the guided and guiding members; and whereby said resilient cantilever portion biases said second bearing into engagement with said second planar surface through said bearing support member and said preload member.

* * * * *